United States Patent
Allred

(10) Patent No.: US 7,171,435 B2
(45) Date of Patent: Jan. 30, 2007

(54) CIRCUITS, SYSTEMS, AND METHODS IMPLEMENTING APPROXIMATIONS FOR LOGARITHM, INVERSE LOGARITHM, AND RECIPROCAL

(75) Inventor: Rustin W. Allred, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 596 days.

(21) Appl. No.: 10/147,844

(22) Filed: May 17, 2002

(65) Prior Publication Data

US 2003/0220953 A1 Nov. 27, 2003

(51) Int. Cl.
*G06F 1/02* (2006.01)
(52) U.S. Cl. .................................. 708/277
(58) Field of Classification Search .............. 708/272, 708/277, 512, 517, 290
See application file for complete search history.

(56) References Cited

U.S. PATENT DOCUMENTS

| | | | | |
|---|---|---|---|---|
| 4,078,250 A * | 3/1978 | Windsor et al. | ............. | 708/204 |
| 5,184,317 A * | 2/1993 | Pickett | ................ | 708/446 |
| 5,600,581 A * | 2/1997 | Dworkin et al. | ............. | 708/277 |
| 6,289,367 B1 * | 9/2001 | Allred | ................ | 708/277 |
| 6,502,118 B1 * | 12/2002 | Chatterjee | ............. | 708/277 |
| 6,678,710 B1 * | 1/2004 | Shankar et al. | ............. | 708/517 |

2003/0037080 A1 * 2/2003 Clifton .................. 708/270

FOREIGN PATENT DOCUMENTS

EP 1001334 A2 5/2000

OTHER PUBLICATIONS

Yi et al., Efficinet algorithms for binary logarithmic conversion and addition, 1998, IEEE, pp. 233-236.*
Jain et al., Hardware implementation of a nonlinear processor, 1999, IEEE, pp. 509-514.*
Mental Math, 2001, http://osf1.gmu.edu/~jschreif/math/math.htm, pp. 1-3.*
Yau, How to handle significant figures in Logarithm, Spring 1999, http://www.townson.edu/~yau/LogarithmSp99.htm, pp. 1-13.*

* cited by examiner

*Primary Examiner*—Kakali Chaki
*Assistant Examiner*—Chat C. Do
(74) *Attorney, Agent, or Firm*—W. James Brady, III; Frederick J. Telecky, Jr.

(57) ABSTRACT

A digital signal system (30) for determining an approximate logarithm of a value of x having a base b is described. The system comprises circuitry for storing x as a digital representation, identifying a most significant digit (MSD) of the digital representation, a table for storing a set of predetermined logarithms having the base b, circuitry for addressing the table in response to a first bit group (t) of the set of bits in respective lesser significant bit locations and for outputting a one of the predetermined logarithms corresponding to a first number ($l_a$) in the set of numbers, and circuitry for outputting the approximate logarithm of the value of x in response to the one of the predetermined logarithms and in response to a function estimation between logarithms at a first and second endpoint.

42 Claims, 3 Drawing Sheets

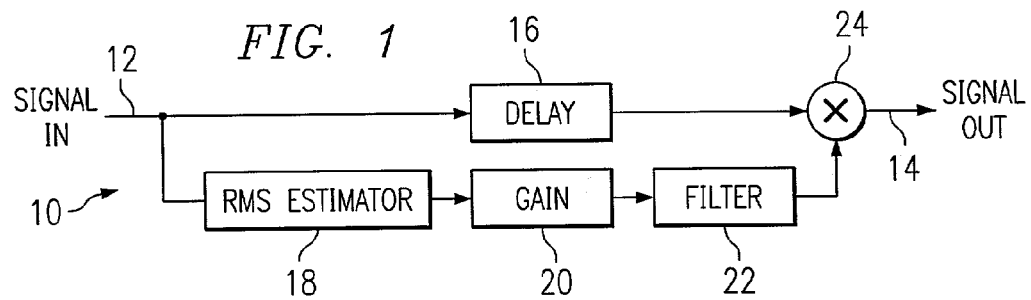
FIG. 1
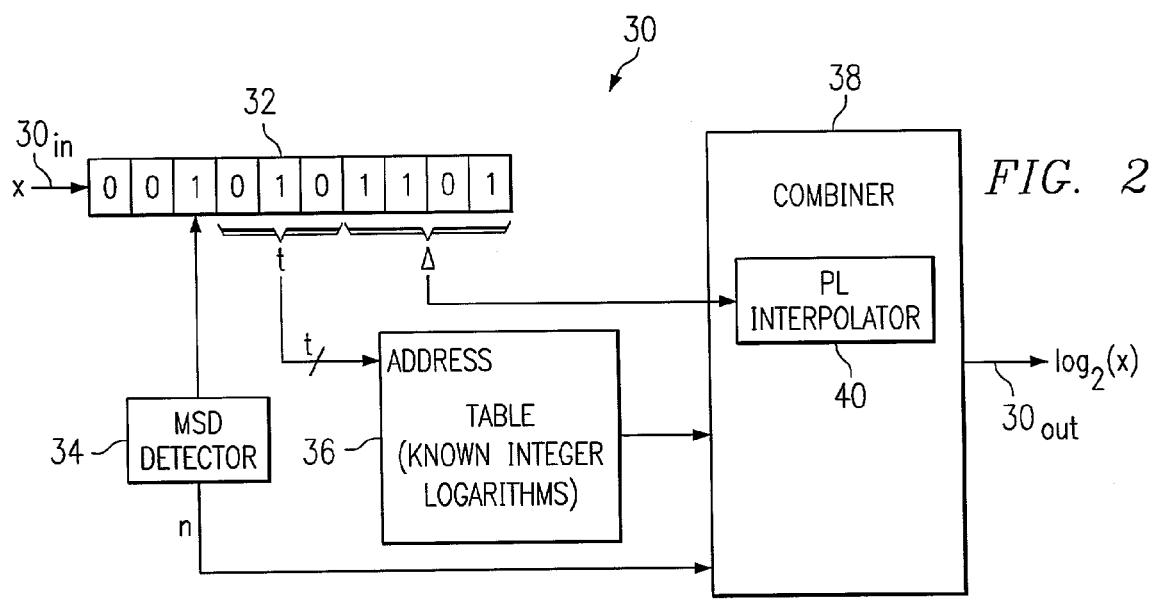
FIG. 2
FIG. 3
| ADDRESS | VALUE STORED |
|---|---|
| 111 | $\log_2(15)$ |
| 110 | $\log_2(14)$ |
| 101 | $\log_2(13)$ |
| 100 | $\log_2(12)$ |
| 011 | $\log_2(11)$ |
| 010 | $\log_2(10)$ |
| 001 | $\log_2(9)$ |
| 000 | $\log_2(8)$ |

| ADDRESS | VALUE STORED |
|---|---|
| 1111 | $\log_2(31)$ |
| 1110 | $\log_2(30)$ |
| 1101 | $\log_2(29)$ |
| 1100 | $\log_2(28)$ |
| 1011 | $\log_2(27)$ |
| 1010 | $\log_2(26)$ |
| 1001 | $\log_2(25)$ |
| 1000 | $\log_2(24)$ |
| 0111 | $\log_2(23)$ |
| 0110 | $\log_2(22)$ |
| 0101 | $\log_2(21)$ |
| 0100 | $\log_2(20)$ |
| 0011 | $\log_2(19)$ |
| 0010 | $\log_2(18)$ |
| 0001 | $\log_2(17)$ |
| 0000 | $\log_2(16)$ |
FIG. 7
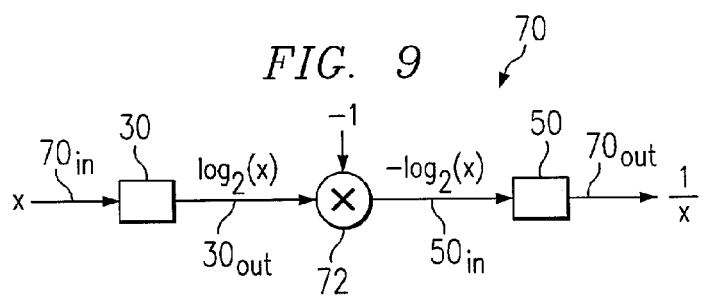
FIG. 9
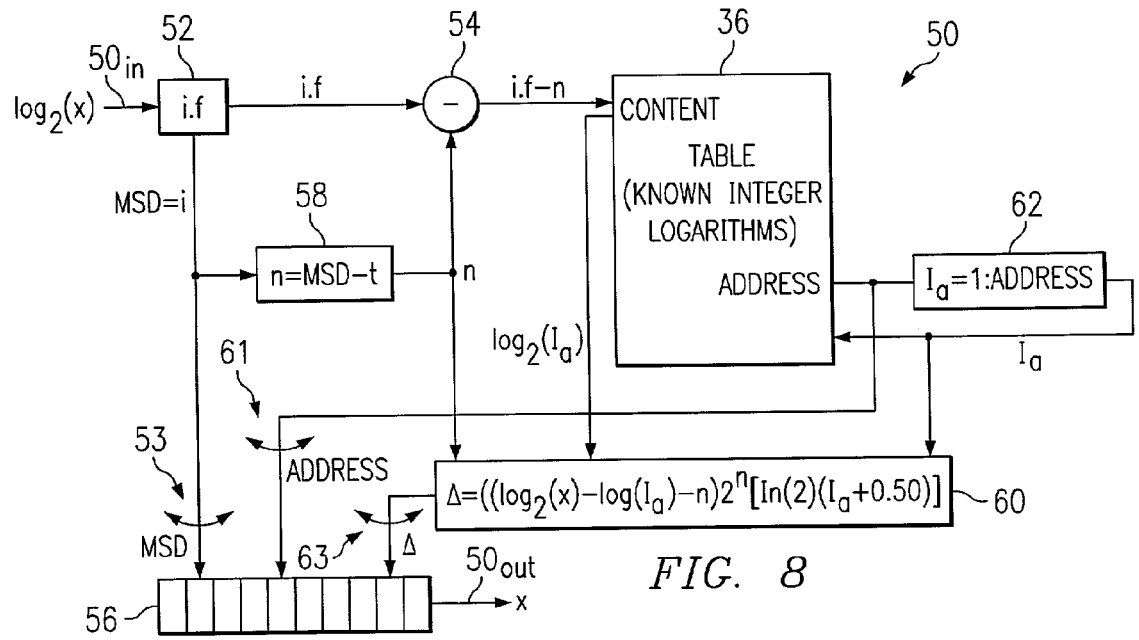
FIG. 8

CIRCUITS, SYSTEMS, AND METHODS IMPLEMENTING APPROXIMATIONS FOR LOGARITHM, INVERSE LOGARITHM, AND RECIPROCAL

CROSS-REFERENCES TO RELATED APPLICATIONS

This application is related to U.S. patent application Ser. No. 10/150,723 entitled "Circuits, Systems, And Methods Implementing Approximations For Inverse Logarithm", and filed on the same date as the present application and having the same inventor.

STATEMENT REGARDING FEDERALLY SPONSORED RESEARCH OR DEVELOPMENT

Not Applicable.

BACKGROUND OF THE INVENTION

The present embodiments relate to signal processing and are more particularly directed to digital signal processing circuits, systems, and methods implementing approximations for logarithm, inverse logarithm, and reciprocals.

Digital signal processing is prevalent in numerous types of contemporary technologies, and it involves various types of devices, signals, and evaluations or operations. For example, devices involved in signal processing may include a general purpose digital signal processor ("DSP"), an application specific processor, ("ASP"), an application specific integrated circuit ("ASIC"), a microprocessor, or still others. The types of processed signals may include various types of signals, where audio signals are one relevant example for reasons detailed below. The operations on these signals may include numerous logic and arithmetic-type operations, where such operations may occur with a general purpose arithmetic logic unit or dedicated hardware/software included within the device performing the signal processing. The present embodiments arise within these contexts, as further explored below.

Given the various device types, signals, and operations involved in signal processing, it is recognized in connection with the present embodiments that the precision involved with some types of signal processing may be between the highest levels demanded in some contexts and the lower levels allowed in others. For example, the precision expected of a mathematical calculation performed by a hand held calculator or central processing unit may be considered to define a standard that is relatively high, while the precision required of some other signal processing may be lower than this high standard. One example where lower precision in signal processing may arise is in an audio signal processor or processing system. Such a system may perform various signal processes and then in response output an audio signal to be played by a speaker or the like. Since the human ear is forgiving of various signal fluctuations, then likewise the signal processing involved may have a lesser standard of precision than is required of the above-mentioned examples of a hand held calculator or central processing unit However, some audio applications may demand or at least benefit from slight or greater than slight improvements in sound signal processing. Consequently, the present embodiments have particular application for this and other instances of signal processing that require a moderate level of signal evaluation precision between the extremes of high and low precision.

By way of further background, note that some contemporary digital processing systems implement relatively costly solutions to signal processing. For example, the present embodiments provide approximations to the functions of logarithms, inverse logarithms, and reciprocals. Thus, where the present embodiments are not used, alternative systems may require sophisticated arithmetic logic units or the like to perform these functions. Such approaches may cause numerous problems, such as increasing device size, complexity, and consequently, device cost. Moreover, in some implementations these increases are simply unacceptable, in which case designs in their entirety may have to be discarded or, at a minimum, considerably altered given the overall system specifications.

By way of still further background, the present inventor has previously invented what is described in U.S. Pat. No. 6,289,367 (hereafter, "the '367 patent"), issued Sep. 11, 2001, entitled, "Digital signal processing circuits, systems, and method implementing approximations for logarithm and inverse logarithm", and hereby incorporated herein by reference. As its title suggests, the inventive teachings of the '367 patent are directed to approximations for the logarithm and inverse logarithm functions. In the '367 patent, the concept of a "most significant digit" is described, which also is detailed below and has application in the present preferred embodiments. The '367 patent also teaches that a logarithm can be broken into an integer and decimal portion, where the integer is identified in the Patent by locating the MSD and then additional operations are performed with respect to the determining the decimal portion or an approximation thereof. By way of contrast, the preferred embodiments also identify the MSD, but thereafter alternative steps are used to obtain greater precision in the logarithm approximation as opposed to that in the '367 patent.

In view of the above, there arises a need to address the drawbacks of prior systems which require complex implementations to determine logarithmic functions and, when needed, to improve the precision provided by the '367 patent. The preferred embodiments are directed to these concerns.

BRIEF SUMMARY OF THE INVENTION

In one preferred embodiment, there is a digital signal system for determining an approximate logarithm of a value of x having a base b. The system comprises circuitry for storing x as a digital representation and circuitry for identifying a most significant digit of the digital representation. Adjacent the most significant digit is located a set of bits in respective lesser significant bit locations. The system further comprises a table for storing a set of predetermined logarithms having the base b, wherein each of the predetermined logarithms corresponds to a number in a set of numbers. The system further comprises circuitry for addressing the table in response to a first bit group of the set of bits in respective lesser significant bit locations, and in response the table is for outputting a one of the predetermined logarithms corresponding to a first number in the set of numbers. Lastly, the system comprises circuitry for outputting the approximate logarithm of the value of x in response to the one of the predetermined logarithms and further in response to a function estimation between logarithms at a first and second endpoint. The first endpoint corresponds to the first number in the set of numbers times a power of b and the second endpoint corresponds to a second number in the set of numbers times the power of b. Further, the function estimation estimates a logarithm at a number located at distance from one of the first and second endpoints, wherein the distance is responsive to a second bit group of the set of bits.

Other circuits, systems, and methods are also disclosed and claimed.

BRIEF DESCRIPTION OF THE SEVERAL VIEWS OF THE DRAWING

FIG. 1 illustrates a block diagram of a dynamic range compressor 10 in which the preferred embodiments may be implemented.

FIG. 2 illustrates generally a base two logarithm estimator.

FIG. 3 illustrates an example of table 36 from FIG. 2.

FIG. 7 illustrates another example of table 36 from FIG. 2.

FIG. 8 illustrates a block diagram of an antilog approximation system.

FIG. 9 illustrates a block diagram of a reciprocal approximation system.

DETAILED DESCRIPTION OF THE INVENTION

Figure 4:
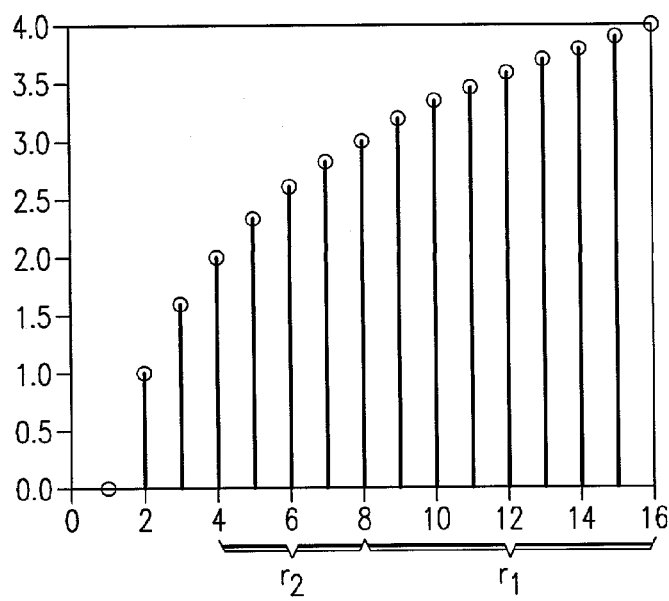
FIG. 4 illustrates a plot of the function of $f(x)=\log_2(x)$ for the values $1 \leq x \leq 16$.

FIG. 1 illustrates a block diagram of a dynamic range compressor 10 which is shown by way of illustration as a signal processing device in which the preferred embodiments may be implemented, and which is also depicted in the above-incorporated U.S. Pat. No. 6,289,367. Dynamic range compressor 10 receives an audio signal at a signal input 12 and, as demonstrated below, provides an output signal at an output 14 in response to the input signal. Before detailing the relationship of the input and output signals, first consider the signal path between input 12 and output 14, which is as follows. Input 12 is connected to the input of a delay circuit 16, and also to the input of a root mean square ("RMS") estimator 18. The output of RMS estimator 18 is connected to the input of a gain circuit 20. The output of gain circuit 20 is connected to the input of a filter 22. The output of filter 22 is connected to an input of a combiner 24, which also has an input connected to receive the output of delay circuit 16. Lastly, each block of dynamic range compressor 10 is shown to demonstrate the overall operation of the device, and from this discussion as well as the skill in the art various circuits may be constructed to achieve this operation. Moreover, while the blocks are separately shown, note that some of the functions of the blocks may be combined or overlap, particularly in view of the type of device or devices used to implement compressor 10.

The operation of dynamic range compressor 10 is now described generally, with a more detailed discussion below. Generally, compressor 10 operates to provide an output signal which has an amplitude swing that is more limited than what is expected of the input signal. In other words, a device such as dynamic range compressor 10 is typically included in a system where there are components within the system that are limited in a manner that cannot handle the anticipated amplitude swing of the input signal at input 10; thus, dynamic range compressor 10 operates to attenuate, or "compress", that swing so that the limitations of these components are not reached. For example, in an audio environment, the output signal may be used to drive a speaker via an analog-to-digital ("A/D") converter and appropriate amplification. Thus, any of these devices may have a limited input range, and by using dynamic range compressor 10 these limits may be avoided so as not to damage the device or cause undesirable operation.

Looking in more detail to the operation of compressor 10, the input signal is delayed by delay circuit 16, and at the same time it is processed by the series of circuits consisting of RMS estimator 18, gain circuit 20, and filter 22. Thereafter, the result of these series of circuits is used to modify the delayed signal via combiner 24, and the ultimate result is the output signal at output 14. Turning to the details of the operation of the series of circuits, RMS estimator 18 determines a measure of the energy of the input signal. In this regard and importantly for context in the preferred embodiments, note that the measure analysis is in the context of an RMS evaluation. More specifically, the input signal is measured by RMS estimator, and one of its attributes (e.g., amplitude) is represented by a measurement which, for purposes of the following discussion, is represented by a value x. Next, the RMS evaluation is made, and as known in the art, such an evaluation is in units of dB, and dB are determined in view of a logarithm as shown in the following Equation 1:

$$dB = 20\log_{10}(x) \qquad \text{Equation 1}$$

The logarithm determination of estimator 18 and relating to Equation 1 is next used to determine the gain to be applied by gain circuit 20. Generally speaking, gain circuit 20 operates so that for a certain range of input signals, the gain is simply 1, that is, the output signal matches the input signal in amplitude (i.e., for every 1 dB in there is 1 dB out). However, for an input signal having an energy beyond a certain threshold, the output is attenuated such that there is 1 dB out for every N dB in, where N exceeds 1. Still further, for some compressors, additional thresholds may be set where, for each such threshold, there is another scale factor implemented by gain circuit 20 and, hence, additional levels of attenuation for even larger input signals. In any event, and also importantly for the context of the preferred embodiments, note that the adjustment by gain circuit 20 is typically achieved in part through the use of an inverse logarithm. In this context, therefore, the inverse logarithm is taken of the value $f(x)$, which recall was based on the measurement x corresponding to an input signal. Next, the adjusted signal from gain circuit 20 is passed to filter 22. Filter 22 operates to smooth the transitions that may arise from gain circuit 20. In the context of audio operations, therefore, filter 22 preferably prevents any stark change in signal output that could be detected by the human ear. Specifically, filter 22 uses different time constants based on whether the gain is increasing or decreasing, where these time constants relate to what is referred to in the art as attack and decay. Lastly, the signal output from filter 22 is combined via combiner 24 with the delayed input signal output by delay circuit 16, thereby presenting an output signal at output 14 for driving a speaker via an A/D converter and appropriate amplification (not shown). To the extent the reader is interested in additional knowledge regarding dynamic range compressors as may be applied to compressor 10, the reader is directed to co-pending U.S. patent application Ser. No. 09/407,552, entitled "Low Implementation Cost Scalable Architecture Dynamic Range Compressor" filed Sep. 28, 1999, having the same sole inventor as the present application, and hereby incorporated herein by reference.

Having described dynamic range compressor 10 and its operation in general, the present embodiments demonstrate implementations directed to approximating a logarithm and inverse logarithm which therefore may be used by RMS estimator 18 and gain circuit 20, respectively. In these regards, while Equation 1 is stated in terms of base 10, in some contexts such as in dynamic range compressors, the same type of general relationship between input and output signals may be evaluated in other numeric base systems. In other words, the behavior of the input/output relationship is the same or similar regardless of whether the energy evaluation of RMS estimator 18 is made in base 10 or in another base. Still further, the preferred embodiments described below are implemented using digital circuits and operate in the context of binary operations which necessarily give rise to base 2 operations. Accordingly, various embodiments are provided below that perform signal processing logarithmic determinations in base 2 rather than base 10. However, various of these inventive considerations may be implemented in other bases, including base 10. Still further, note that logarithms of different bases have the mathematical relationship shown in the following Equation 2:

$$\log_a(z) = \frac{\log_b(z)}{\log_b(a)} \qquad \text{Equation 2}$$

From Equation 2, one skilled in the art will appreciate that given a determination of a logarithm in a first base (e.g., base b), that determination may be scaled by a constant (i.e., $1/\log_b(a)$) to determine a logarithm in a second base (e.g., base a). Accordingly, while the following discussions are directed to base 2 determinations, it also should be noted that the results may be scaled by a constant to achieve a base 10 or other base determination.

Attention is now directed to the preferred methodologies for approximating the values for a base 2 logarithm. Thus, by way of introduction, it is one purpose of the preferred embodiments to provide an approximation for $f(x)$ in the following Equation 3:

$$f(x) = \log_2(x) \qquad \text{Equation 3}$$

To implement a digital circuit solution to Equation 3, and for reasons apparent later in this document, the present inventor recognized in the previously-incorporated U.S. Pat. No. 6,289,367 that it is helpful to solve Equation 3 by breaking the solution into an integer and fraction portion, as defined in the following Equation 4:

$$\log_2(x) = i + f \qquad \text{Equation 4}$$

where,
i is the integer portion of the solution of Equation 4; and
f is the decimal (or fraction) portion of the solution of Equation 4.

For an example of Equation 4, consider the simple case of x=4, then for $\log_2(4)$, i=2 and f=0. To ultimately provide an approximate solution for Equation 3, the incorporated U.S. Pat. No. 6,289,367 set forth to separately determine i and f as shown in Equation 4, and then solved Equation 3 by adding these two separately determined values. The present preferred embodiments, however, operate in various different manners, as described below. However, both cases benefit from a concept of a "most significant digit" as described in U.S. Pat. No. 6,289,367 and which is therefore now reviewed with respect to Equation 4 and then later applied to the preferred embodiments.

Reviewing from U.S. Pat. No. 6,289,367 the methodology for determining i in Equation 4, and also for reasons apparent later in this document, the present inventor has recognized that in a digital circuit implementation of Equation 3, it is helpful to further separate x in $f(x)$ as in the following Equation 5:

$$x = l + r \qquad \text{Equation 5}$$

where,
l is the largest power of 2 such that $1 \leq |x|$; and
r is the remaining portion of x not included in l.

For an example of Equation 5, consider the case of x=43. Thus, l equals the largest power of 2 which is equal to or less than 43 and, therefore l is equal to 32 (i.e., $2^5 = 32 \leq 43$). In addition, the remainder r is therefore equal to decimal 11 (i.e., 43−32=11).

The implication of Equation 5 as implemented in a digital circuit is now further appreciated by letting l from Equation 5 further be defined by the following Equation 6:

$$l = 2^p \qquad \text{Equation 6}$$

In Equation 6, p is the power to which 2 is raised to provide l. As an example to appreciate the value of p in Equation 6, consider again the case of x=43. Recalling that l equals the highest power of 2 which is equal to or less than 43 (i.e., l=32), then p is the power of 2 which results in l and, thus, p=5 (i.e., $2^p = 2^5 = 32$).

Next, substituting the value of l from Equation 6 into Equation 5 yields the following Equation 7:

$$x = l + r = 2^p + r \qquad \text{Equation 7}$$

From Equations 6 and 7 it becomes evident that another way to determine the value of l is to determine the value of p, and l therefore may be determined by raising 2 to the power of p. This observation is noteworthy in the present embodiments because below it is related to viewing how numbers represented in binary fashion may be processed in a digital circuit to implement the preferred embodiments. Particularly, the preferred embodiments use the advantage arising from the realization that for a number represented in binary form, the value of p in Equations 6 and 7 is equal to the location of the most significant non-zero bit in the binary representation. To demonstrate this notion with an example, consider again the case where x=43; for this example, then the value of x in an eight-bit binary representation is shown immediately below in Table 1, which also identifies the position of each bit in the representation.

TABLE 1

| | | | | | | | | |
|---|---|---|---|---|---|---|---|---|
| Binary value for x = 43 | 0 | 0 | 1 | 0 | 1 | 0 | 1 | 1 |
| Bit position | 7 | 6 | 5 | 4 | 3 | 2 | 1 | 0 |

In Table 1, note that bits are listed with the more significant bits to the left and the lesser significant bits to the right, and this convention is followed through the remainder of this document; however, this convention is also only by way of illustration and one skilled in the art will appreciate that the present teachings equally apply where the bits are arranged in opposite order. Given this convention and the illustration of Table 1, it is seen that the most significant non-zero bit in the binary representation occurs in bit position 5. Thus, consistent with the premise accented above, the value of p in Equations 6 and 7 equals that bit position, and for x=43, therefore p=5 (i.e., $2^p = 2^5$). For purposes of the remainder of this document, this digit, that is, the one in the position of the most significant non-zero bit, is referred to as a most significant digit ("MSD").

From the above, it now may be appreciated by one skilled in the art that p is ascertainable from a binary representation of the value of x in that the value of p is determined by locating the MSD in x. In other words, MSD=p. In this regard, the preferred techniques for determining the MSD are discussed later. At this point, however, it is also useful to demonstrate that the preceding variable definitions result in the value of p equaling the value of i in Equation 4. For purposes of later reference, therefore, this relationship is denoted below as Equation 8:

$$p=MSD=i \qquad \text{Equation 8}$$

This relationship set forth in Equation 8 is readily appreciated by continuing with the example of x=43, and is further explored with some other examples immediately below.

For x=43, it has been shown that the MSD, which also is defined as p, equals 5. Also, using a calculator to solve Equation 4 for the value of i, results in the following Equation 9:

$$\log_2(43)=i+f=5+f \qquad \text{Equation 9}$$

In other words, the integer portion of the base 2 logarithm, i, has now been shown to be the same as the MSD. By way of another example, assume that x=70. Thus, the binary representation of 70 is as shown in the following Table 2:

TABLE 2

| Binary value for x = 70 | 0 | 1 | 0 | 0 | 0 | 1 | 1 | 0 |
|---|---|---|---|---|---|---|---|---|
| Bit position | 7 | 6 | 5 | 4 | 3 | 2 | 1 | 0 |

From Table 2, therefore, the MSD for x=70 is 6. Thus, under the above proposition, this MSD of 6 is also equal to i. This may be confirmed through a calculator or the like, which indicates that $\log_2(70)=6.129$. In other words, in terms of Equations 4 and 8, i equals 6. As one final example, assume that x=31. Thus, the binary representation of 31 is as shown in the following Table 3:

TABLE 3

| Binary value for x = 31 | 0 | 0 | 0 | 1 | 1 | 1 | 1 | 1 |
|---|---|---|---|---|---|---|---|---|
| Bit position | 7 | 6 | 5 | 4 | 3 | 2 | 1 | 0 |

From Table 3, therefore, the MSD for x=31 is 4. Thus, under the above proposition of Equation 8, this MSD of 4 is also equal to i. This may be confirmed through a calculator or the like, which indicates that $\log_2(31)=4.954$. In other words, in terms of Equations 4 and 8, i equals 4. From the preceding, therefore, as well as other examples that may be performed by one skilled in the art, it is shown that by determining the MSD given a binary representation, then a methodology for determining i in Equation 4 has been provided. Thus, once p is determined, there is correspondingly a solution determined for i.

As detailed extensively below, the preferred embodiments determine the approximate logarithm of x of Equation 3 in general by three steps, and taken with respect to x as presented in binary form. These three steps are now functionally illustrated with the block diagram of FIG. 2, which depicts generally a base two logarithm estimator 30. Estimator 30 is shown in block functional form and, thus, one skilled in the art may embody these blocks in separate or combined form based on various design considerations. In any event, as detailed later, estimator 30 operates to receive a value of x at its input $30_{in}$ and to produce an estimation of its base 2 logarithm, $\log_2(x)$, at its output $30_{out}$. Estimator 30 includes a storage element 32 for storing a binary representation of x, that is, the number for which a base 2 logarithm is to be estimated. For sake of example, in FIG. 2 storage element 32 is shown to be 10 bits, but any length sufficient for an anticipated application may be implemented.

Associated with storage element 32 is an MSD detector 34, which detects the location of the MSD and may do so according to various implementations such as those in the above-incorporated U.S. Pat. No. 6,289,367. For example, MSD detector 34 may include a shift register which copies into it the value of x from storage element 32, and then successively shifts the copied value to the right while checking after each shift to identify once the shifted value equals one. As an another alternative, the shift register could shift the value of x to the left while checking after each shift to identify once the shifted value equals or exceeds the largest power of 2 which may be stored in the register. As an another alternative approach to implementing MSD detector 34, it could include a logic circuit that implements a truth table based on a word of w bits stored in storage element 32, and that provides an output word that identifies the MSD in the w-bit word. As still another approach, a binary search technique could be used that, by way of example, searches portions of the word stored in storage element 32 and then eliminates various portions to eventually converge on the location of the MSD.

Once the MSD is identified by MSD detector 34, the next t lesser significant bits adjacent and following the MSD are connected as an address to a table 36, where t is a predetermined number based on consideration of one skilled in the art; in the example of FIG. 2, t=3 so 3 bits are shown as an address to table 36. For reasons more clear below, table 36 is any type of suitable electronic storage media and it stores $2^t$ number of values, where each value is a highly-precise and predetermined base two logarithm of an integer $I_1$ through $I_{2^t}$, where preferably the integers are from $2^t$ to $2^{t+1}-1$; thus, in the present example, table 36 stores the highly-precise base two logarithms for each integer in the range of $2^3$ to $2^{3+1}-1=8$ through 15. Further in this regard, FIG. 3 also illustrates this example of table 36 indicated generally at 36'. FIG. 3 also illustrates the preferred logical orientation of the stored values in table 36', namely, where each ascending value is given a corresponding ascending address. Thus, the smallest base 2 logarithm in table 36', namely, $\log_2(8)$, is stored at a binary address of 000, while the largest base 2 logarithm in table 36', namely, $\log_2(15)$, is stored at a binary address of 111. In any event and returning to FIG. 2, the t bits from storage element 32 address a corresponding one of the stored values in table 36, and table 36 in response outputs the addressed value (i.e., the highly-precise logarithm). Lastly and as explained later, note that if the number of bits following the MSD in storage element 32 are less than t, then the address provided by the t bits is created by appending an appropriate number of trailing zeroes. For example, if x=5 and t=3, then in binary form x=101. Once the MSD is detected, one skilled in the art will appreciate that only two bits follow the MSD, whereas t=3. Thus, in this example a single zero is appended to the end of the value of 01 which follows the MSD, thereby creating a 3-bit address of 010 as the t bits for addressing table 36.

The addressed value from table 36 (or table 36' in the example of FIG. 3) is provided to what is shown as a combiner 38. Also in connection with storage element 32, a number of bits, if any, that are in storage element 32 and of less significance than the t bits, form a binary value indicated as $\Delta$. The value $\Delta$ is output to a piecewise linear ("PL") interpolator 40, which for reasons detailed later is shown as a part of the overall function of combiner 38. Particularly, PL interpolator 40 represents that combiner 38, in part as shown by PL interpolator 40, determines the estimated base $2^n$ logarithm of x based on how far x is from an integer having a corresponding highly-precise logarithm stored in table 36 (or one of those integers times $2^n$ as detailed below), where that distance is reflected in the value of $\Delta$. Also in this regard, the value of n is equal to MSD-t and is shown to be provided to combiner 38 from MSD detector 34 (which is presumed to have access to the value of t=3). As detailed below, combiner 38 combines its various inputs to provide the approximation of the base two logarithm of x.

By way of further introduction, the operation of estimator 30 is as follows. First, MSD detector 34 identifies the location of the MSD of x. Second, table 36 is addressed with the t bits following the MSD, and from table 36 a correspondingly highly precise base 2 logarithm is provided of an integer having its base 2 logarithm stored in table 36, where of all integers in table 36 that integer times $2^n$ is closest to but less than x. Third, a piecewise linear interpolation of the logarithm is made based on the difference between x and $2^n$ times the integer for which a highly-precise logarithm value was provided by table 36, with combiner 38 representing the accumulation of these operations into a final approximation of the base two logarithm of x. Each of these steps is further detailed below, but are preceded by various mathematic and other relationships that further facilitate an understanding of the preferred embodiments.

To better appreciate the use of table 36 in response to the number t of bits following the MSD, FIG. 4 illustrates a plot of the function of Equation 3 for the values $1 \leq x \leq 16$. Also, for sake of reference, a highly-precise value of $\log_2(x)$ for each integer in the values $8 \leq x \leq 16$ are shown in the following Table 4:

TABLE 4

| x | f(x) = $\log_2(x)$ |
|---|---|
| 8 | 3 |
| 9 | 3.169925 |
| 10 | 3.321928 |
| 11 | 3.459432 |
| 12 | 3.584963 |
| 13 | 3.70044 |
| 14 | 3.807355 |
| 15 | 3.906891 |
| 16 | 4 |

From the plot of FIG. 4 and the values in Table 4, the general slope of the logarithm function as known in the art is seen; however, an additional point also is noteworthy. Specifically, as indicated in FIG. 4, the values of x in Table 4 are designated as a first range $r_1$, where $r_1$ is bounded by endpoint values of $x=2^{3=8}$ and $x=24=16$. Thus, range $r_1$ spans one power of 2. The plot as well as the following discussion now illustrates that given a highly-precise logarithm value of $f(x)$ in a power of 2 range $r_1$, then a corresponding highly-precise logarithm value can be determined for a value $x_d$ in any other power of 2 range, so long as $x_d$ is a same relative distance from an endpoint in its range as is x from the corresponding endpoint in range $r_1$. This result is first shown practically by expanding Table 4 into the form of the following Table 5, which also includes the values of x in a power of 2 range $r_2$ that is bounded by endpoints $x=2^{2=4}$ and $x=2^3=8$, as also plotted in FIG. 4.

TABLE 5

| range $r_1$ | | range $r_2$ | |
|---|---|---|---|
| x | f(x) | x | f(x) |
| 8 | 3 | 4 | 2 |
| 9 | 3.169925 | | |
| 10 | 3.321928 | 5 | 2.321928 |
| 11 | 3.459432 | | |
| 12 | 3.584963 | 6 | 2.584963 |
| 13 | 3.70044 | | |
| 14 | 3.807355 | 7 | 2.807355 |
| 15 | 3.906891 | | |
| 16 | 4 | 8 | 3 |

By way of example for Table 5, below are compared the base 2 logarithm values for x=10 in range $r_1$ with x=5 in range $r_2$ to illustrate two aspects that are further exploited in the preferred embodiments.

As a first aspect exploited in the preferred embodiments, note in the comparison of the base 2 logarithms for x=10 and x=5 that the relative distance for each of these values is 25 percent from the lower endpoint of the respective power of 2 range. In other words, x=10 is in range $r_1$ which spans $8 \leq x \leq 16$ and, thus, x=10 is 25 percent $$\left(\text{i.e.,}\ \frac{10-8}{16-8} = .25 = 25\%\right)$$

away from the lower endpoint x=8 in range $r_1$; similarly, x=5 is in range $r_2$ which spans $4 \leq x \leq 8$ and, thus, x=5 is 25 percent $$\left(\text{i.e.,}\ \frac{5-4}{8-4} = .25 = 25\%\right)$$

away from the lower endpoint x=4 in range $r_2$. Given these identical distances from a range endpoint (e.g., the lower endpoint of the respective range), then the decimal portion of the logarithms for each value is identical, which in this case and as shown in Table 5 equals to 0.321928.

As a second aspect exploited in the preferred embodiments, note that the difference between the base 2 logarithm of the two compared example values of x=10 and x=5 (i.e., 3.321928 and 2.321928) is equal to the integer range distance between the respective power of 2 ranges of these two values of x. In other words, each range is an integer range distance n from any other range, where because each range spans a power of 2 then each logarithm of a first number x in a first power of 2 range is the same integer n apart from a logarithm of a second number in a second and different power of 2 range, and for each such first number in the first range it is $2^n$ times the second number x in the second range (where n can be positive or negative). For instance, in the present example of Table 5, range $r_2$ is one range apart from range $r_1$, that is, the numbers in range $r_2$ have counterparts that are $2^n=2^1$ distance from the numbers in range $r_1$. Further, because range $r_2$ is in the negative direction relative to range $r_1$, then it may be said that range $r_2$ is a negative one range apart from range $r_1$. As another example, if FIG. 3 and Table 5 were to illustrate a third range $r_3$ spanning $16 \leq x \leq 32$, then it would be one positive range apart from range $r_1$ and two positive ranges apart from range $r_2$. Now, returning to the examples of x=10 and x=5, note that the difference between their respective logarithms equals one (i.e., 3.321928−2.321928=1) and, as stated above, this same difference is the range distance between range $r_1$ (for x=10) and range $r_2$ (for x=5).

The two aspects discussed above apply to all corresponding values in Table 5 that are the same relative distance from the lower endpoint of their respective ranges. As another example, therefore, compare the logarithm for x=12 versus x=6. Specifically, from Table 5, $\log_2(x=12)=3.584963$, and x=12 in range $r_1$ is 50% away from the lower endpoint of its range $r_1$, namely, from x=8. Turning then to x=6, it is in range $r_2$ and it too is 50% away from the lower endpoint of its range $r_2$, namely, from x=4. Accordingly, the base 2 logarithms for these like-positioned values of x have the same decimal portion, namely, 0.584963. Further, range $r_2$ is −1 in range distance from range $r_1$, then from the preceding it should be the case that the $\log_2(x=6)=\log_2(x=12)-1$. By comparing the respective $f(x)$ values of 3.584963 and 2.584963 in Table 5, one skilled in the art can confirm this relationship. From the above, therefore, one skilled in the art should appreciate that given a known base 2 logarithm in a first power of 2 range, a base 2 logarithm for a like-positioned number in a second power of 2 range may be determined quite readily by adding the integer distance between the first and second power of 2 ranges to the known logarithm in the first range. The preferred embodiments implement this aspect by storing the base 2 logarithms of integers for one power of 2 range in table 36 (or table 36'). Briefly returning, therefore, to FIG. 3, one skilled in the art will now appreciate that table 36' stores highly-precise values for the base 2 logarithms of integers in range $r_1$ (with the exception of the base 2 logarithm for x=16, which is readily obtainable by adding one to the base 2 logarithm for x=8). Accordingly, and as detailed later, the preferred embodiments in part determine the base 2 logarithm of a value $x_d$ outside of range $r_1$ based on the distance between range $r_1$ and the power of 2 range in which $x_d$ is located.

Having described the above two aspects by way of examples and for adjacent power of 2 ranges, the principles now also may be confirmed mathematically and which further facilitates various of the later-described aspects of the preferred embodiments. To demonstrate the mathematics, reference is again made to the first example above of comparing the base two logarithms for x=10 and x=5, which recall as shown above differ by an amount of −1. First, the base two logarithm for x=10 is shown in the following Equation 10:

$\log_2(10)=3.321928$   Equation 10

However, the value of x=10 may be broken down based on a factor of 2, as shown in the following Equation 11:

$\log_2(2\times 5)=3.321928$   Equation 11

Logarithm principles allow Equation 11 to be further divided into a sum of two addends, as shown in the following Equation 12:

$\log_2(2\times 5)=log_2(2)+\log_2(5)=3.321928$   Equation 12

Finally, the addend $\log_2(2)$ from Equation 12 is easily obtainable or known and, thus, Equation 12 may be re-written in the form of the following Equation 13:

$\log_2(2\times 5)=1+\log_2(5)=3.321928$   Equation 13

Equation 13, therefore, confirms what is shown in graphical and tabular form, above, via FIG. 4 and Table 4, that is, that the $\log_2(10)$ is an integer one greater than the $\log_2(5)$.

The preceding also may be generalized for power of 2 ranges that are farther than one range apart. Specifically, if n=1, then Equation 12 may be written in the form of the following Equation 14:

$\log_2(2^n \times 5)=\log_2(2^n)+\log_2(5)=3.321928$   Equation 14

Also, since $\log_2(2^n)=n$, then Equation 14 may be re-written as shown in the following Equation 15:

for n=1, $\log_2(2^n \times 5)=n+\log_2(5)=3.321928$   Equation 15

Equation 15 therefore also provides a general expression to determine the base 2 logarithm for any value equal to five times a power of 2, that is, it may be generalized in the form of the following Equation 16:

$\log_2(2^n \times 5)=n+\log_2(5)$   Equation 16

Given the preceding, Equation 16 mathematically confirms what is suggested above and also elaborates on the function in FIG. 2 of applying the t bits to table 36, that is, given a first precise logarithm value for a number x (e.g., x=5), then an equally precise value can be found for $2^n \times x$ by summing the first precise logarithm with n. The preceding may be further shown by considering the stated example in reverse, that is, given a known highly-precise base 2 logarithm of decimal 10, then an equally precise base two logarithm of any multiple of $2^n$ times decimal 10 may be determined readily by adding n to the known value (e.g., getting from $\log_2(10)$ to $\log_2(5)$ since $10\times 2^{-}=5$). Thus, referring back to FIG. 2 and recalling that table 36 stores a highly-precise value of the logarithm of $2^t$ consecutive integers, note then that the t bits following the MSD therefore select a single highly-precise logarithm value of a number that when multiplied times $2^n$ is closer to and less than x as compared to $2^n$ times any other number having a base 2 logarithm in table 36. In the example where x=5 (i.e., binary 101), then the binary value of the t bits following the MSD, and having appended a trailing zero, is 010. This value indicates the preceding example of a look-up in table 36' of the highly-precise value of $\log_2(10)$. Once that value is known, since x=5 is an exact multiple of $2^n$ times decimal 10, then the base two logarithm of x=5 may be determined by adding the value of n to it. As introduced above and as further explored below, n=MSD−t, which in this example is 2−3=−1. Accordingly, estimator 30 can conclude the approximation of the base 2 logarithm of x by adding the value of $\log_2(10)$ of n to the appropriate value in table 36.

An additional example is also instructive for larger values of x and consistent with the preceding. Thus, attention is now directed to the example actually shown in FIG. 2, where storage element 32 stores the binary value x=0010101101. One skilled in the art can readily confirm that this binary values equals a decimal value of 173. Again using the example of t=3, then first it is known from the preceding that table 36' stores $2^t$ highly-precise base 2 logarithms for the integers of $2^3$ through $2^{3+1}-1$, that is, from decimal 8 to decimal 15, as shown in table 36' in FIG. 3. Also, as explained above, n can be added to these base 2 logarithms as a partial effort to determine the $\log_2(x)$. In this regard and to select the appropriate value from table 36', the t=3 bits following the MSD in storage element 32 equal 010, and they are used to address table 36'. Accordingly, as shown in FIG. 3, the address of 010 corresponds to the integer 10 and its corresponding tabled value of $\log_2(10)$; hence, that value is output to combiner 38. This selection is preferred because for all the integers having logarithm values stored in table 36', the integer 10 times $2^n$ is closer to and less than x=173 as compared to $2^n$ times any other integer for which a logarithm is stored in table 36'. In other words, consider the following Table 6, which shows each integer having a table value in table 36' of FIG. 3, and which further illustrates each such integer times $2^n$, for n={1, . . . , 4}.

TABLE 6

| Integer | ×2$^1$ | ×2$^2$ | ×2$^3$ | ×2$^4$ |
|---|---|---|---|---|
| 15 | 30 | 60 | 120 | 240 |
| 14 | 28 | 56 | 112 | 224 |
| 13 | 26 | 52 | 104 | 208 |
| 12 | 24 | 48 | 96 | 192 |
| 11 | 22 | 44 | 88 | 176 |
| 10 | 20 | 40 | 80 | 160 |
| 9 | 18 | 36 | 72 | 144 |
| 8 | 16 | 32 | 64 | 128 |

Looking in Table 6 and by locating the example for x=173 between any two consecutive values therein, note that x=173 falls within the region between and including the endpoints of 160 and 176, as shown in the last column of Table 6. Stated in another fashion, x lies between the region that spans $2^4 \times 10 = 160 > x \leq 2^4 \times 11 = 176$, that is, x=173 is between $2^n$ times two of the integers having highly-precise tabled logarithm values, namely, $\log_2(10)$ and $\log_2(11)$. In other words, for all the integers represented in Table 6 (and correspondingly in table 36'), the integer 10, when multiplied times a factor of $2^n$, where n=4, is closest to and below the value of x=173. Accordingly and as further appreciated below, the preferred embodiments base their estimation of $\log_2(173)$ in part on the base 2 logarithm of this lower endpoint of $\log_2(10)$.

Continuing with the example of x=173 and returning to FIG. 2, recall that MSD−t=n and, thus, in the present example n=4. Accordingly, as a first estimation of $\log_2(173)$, there can be determined a value of $\log_2(10 \times 2^4) = \log_2(10) + 4 = \log_2(160)$. Of course, such an estimation is not highly accurate in this case because it represents a value of x=160, whereas the desired example is x=173. In other words, for the example of x=173, and since the highly-precise known logarithm corresponds to $\log_2(10 \times 2^n)$, then the closest logarithm which can be approximated using only this step would correspond to the $\log_2(160)$. However, in this example, x=173=10×2$^4$+13, that is, x is 13 integers away from the highly-precise table-derived value of $\log_2(160)$. As a result and as detailed below, the preferred embodiments further adjust the approximation due to the additional aspect that x=173 is some distance away from the available highly-precise table-derived logarithm value.

Figure 5:
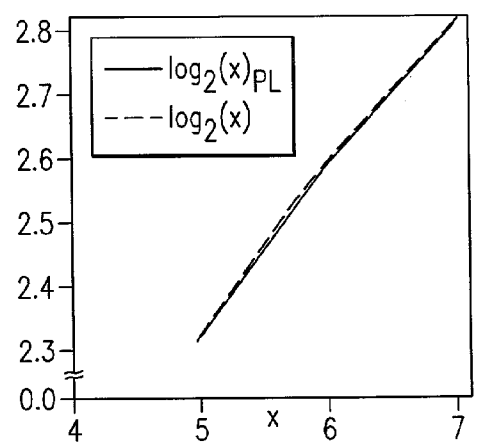
FIG. 5 illustrates an expanded view of a portion of range $r_2$ of FIG. 4.

Continuing with the example for x=173, and as will be the case in many instances, the value of x (i.e., for which the base 2 logarithm is sought) will not be an exact multiple of $2^n$ times an integer having a base 2 logarithm stored in table 36. In such cases, estimator 30 further develops its approximation of $\log_2(x)$ using piecewise linearization as indicated by PL interpolator 40 in FIG. 2 and as is now further explored. In this regard, FIG. 5 illustrates an expanded view of a portion of range r2, which recall is bounded by endpoints x=4 and x=8. Further, in FIG. 5, the actual plot of $\log_2(x)$ is shown as a dotted line, whereas a piecewise linear plot designated $\log_2(x)_{PL}$ is also shown as solid lines between the respective values of $\log_2(x)$ for each of x=5, x=6, and x=7. Given these two plots, the preferred embodiments further take advantage of the fact that within a power of 2 range the actual plot and the piecewise linear plot are fairly close to one another; as a result, the preferred embodiments use piecewise linearization when the sought base 2 logarithm is of a number x that does not have an exact counterpart times $2^n$ in table 36, yet the proximity of the actual and piecewise linear approximation plots in FIG. 5 indicates that this approach still provides an acceptably low amount of error.

Figure 6:
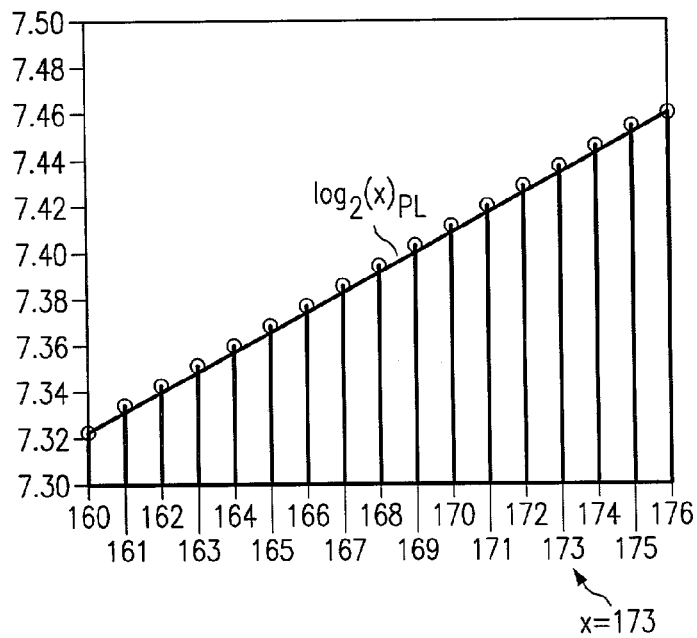
FIG. 6 illustrates the actual base 2 logarithms for the region $160 \leq x \leq 176$.

The extent to which piecewise linearization is used by PL interpolator 40 to augment the approximation provided by table 36, as adjusted by n, is reflected in the value Δ. Particularly, recall that Δ is defined in FIG. 2 as the value of the bits following the t bits in storage element 32. As is now demonstrated, this Δ indicates the difference between x and $2^n$ times the integer for which a highly-precise base 2 logarithm is stored in table 36, where that integer is addressed by the t bits. For example, recall the example shown in FIG. 2, wherein x=173. As shown above, for x=173 the corresponding highly-precise stored and addressed base two logarithm is for $\log_2(10)$, and an integer n=4 may be added to it to obtain a correspondingly highly-precise value for $\log_2(10 \times 2^4 = 160)$. With that determination, recall the distance from this value to the desired x=173 is 13 (i.e., 173−160=13). Now, looking to storage element 32 in FIG. 2, it may be seen that the binary value of Δ is 1101, which one skilled in the art will confirm equals decimal 13. The preceding is also demonstrated graphically in FIG. 6, which illustrates the actual base 2 logarithms for the integers in the region 160≤x≤176, in which x=173 falls. Particularly, the FIG. 6 region having endpoints x=160 and x=176, is implicated in this example because it represents an area for which the endpoints have highly-precise obtainable base 2 logarithms by adding n to the corresponding highly-precise tabled logarithm values of $\log_2(10)$ and $\log_2(11)$. In FIG. 6, it can be visually appreciated that the base 2 logarithms in a region that spans less than a power of two (e.g., 160≤x≤176), as in other regions such as explained earlier in connection with FIG. 5, are near linear, as shown by comparing the solid piecewise linear line $\log_2(x)_{PL}$ drawn between the $\log_2(160)$ and $\log_2(176)$, as compared to the actual logarithm data point shown for each integer in the region. Of course, some error may arise and indeed, looking by way of example to x=173, it may be seen that its actual base 2 logarithm is slightly greater than that approximated by the piecewise linear line $\log_2(x)_{PL}$. Nonetheless, this error is slight and it also only affects the overall estimate of $\log_2(173)$ insofar as it relates to the Δ of 13 between it and $\log_2(160)$; hence, the final approximation is quite usable for many logarithm applications. Accordingly and as further detailed below, the preferred embodiments use piecewise linear interpolation from the endpoint of such a region to the value of x in order to further refine the highly-precise known base 2 logarithm for the lower endpoint (e.g., 160) of the region.

The preceding principle with respect to Δ is true for any number of bits in storage element 32 and any selected value of t. For example, assume again that x=173 as shown in FIG. 2, but assume also that t=4. In this case, table 36 stores the $2^t$ values shown as table 36" in FIG. 7. Specifically, in FIG. 7 table 36" stores the base 2 logarithms of $2 = 2^{4=16}$ integers, where these integers are in the range of $2^t$ through $2^{t+1}−1=16$ through 31. First, the t=4 bits indicate an address of 0101 (i.e., decimal 5), thereby addressing the logical fifth value in table 36", namely, $\log_2(21)$. Here, however, the value of n is 3 rather than 4 as in the previous example because here t has been increased from 3 to 4, thereby reducing n from 4 to 3.

As a result, n=3 may be added to the identified $\log_2(21)$ to thereby once more produce the corresponding highly-precise base 2 logarithm of $\log_2(21\times2^3)=\log_2(168)$. Next, the n=3 remaining lesser significant bits following the t bits equal a binary value of 101, which indicates a decimal value for $\Delta$ equal to 5. In other words, in this example, x corresponds to a tabled logarithm value of the integer number 21, and that integer times $2^3$ gives rise to a region bounded by a lower endpoint of 168; the value x=173 is then a distance of 5 from that lower endpoint (i.e., 173−168=5).

In the preferred embodiments, piecewise linearization is combined with the other aspects described above, which is why PL interpolator 40 is shown as part of combiner 38 in FIG. 2. These combined aspects are now demonstrated mathematically, which should be further appreciated given the various already-described details. First, for piecewise linearization in general, assume for a given plot its endpoints $(x_1, y_1)$ and $(x_2, y_2)$ are known, and there is a goal of determining an estimation of $y_3$ at $x_3$ along that plot by assuming a linear relationship between the two endpoints. First, the slope of the line between the two endpoints, where the slope is typically designated as m, is ascertainable according to the following Equation 17:

$$m = \frac{\Delta y}{\Delta x} = \frac{y_2 - y_1}{x_2 - x_1} \qquad \text{Equation 17}$$

Next, the y intercept, herein designated as B, can be developed as follows. First, the intercept can be defined with respect to the known $x_1$ and $y_1$, as shown in the following Equation 18.

$$y_1 = \frac{y_2 - y_1}{x_2 - x_1} x_1 + B \qquad \text{Equation 18}$$

Equation 18 may be re-arranged in terms of B as shown in the following Equation 19:

$$B = y_1 - \frac{y_2 - y_1}{x_2 - x_1} x_1 \qquad \text{Equation 19}$$

From the preceding, and now to calculate $y_3$ for a value of $x_3$, then $y_3$ may be written according to the following Equation 20 using m from Equation 17 and B from Equation 19:

$$y_3 = \frac{y_2 - y_1}{x_2 - x_1} x_3 + y_1 - \frac{y_2 - y_1}{x_2 - x_1} x_1 \qquad \text{Equation 20}$$

Simplifying Equation 20 to factor out the common term, $$\frac{y_2 - y_1}{x_2 - x_1},$$

provides the following Equation 21:

$$y_3 = \frac{y_2 - y_1}{x_2 - x_1}(x_3 - x_1) + y_1 \qquad \text{Equation 21}$$

Equation 21 may be written as a function that estimates any value of x along a line passing through the two known endpoints, designating the estimate of this function as $\hat{f}(x)$ and as shown in the following Equation 22:

$$\hat{f}(x) = \frac{y_2 - y_1}{x_2 - x_1}(x - x_1) + y_1 \qquad \text{Equation 22}$$

While the preceding Equations 17 through 22 develop piecewise linearization in general, those principles now may be applied to the preferred embodiments logarithmic function of $f(x)=\log_2(x)$. Particularly, assume for a value of x=a that $\log_2(x=a)$ is known and assume for a value of x=b that $\log_2(x=b)$ is known, then a piecewise linear estimate function may be developed for any value between these known endpoints, that is, for any x in $a \leq x \leq b$, by substituting the known function values at the endpoints into Equation 22 thereby resulting in the following Equation 23:

$$\hat{\log}_2(x) = \frac{\log_2(a) - \log_2(b)}{a - b}(x - a) + \log_2(a) \qquad \text{Equation 23}$$

Now, returning to some of the earlier preferred embodiment principles, recall that table 36 provides highly-precise values for $f(x)=\log_2(x)$ where x is one of $2^t$ known integers $I_1$ through $I_{2^t}$. Further, for any two consecutive ones of those integers $I_a$ and $I_{a+1}$, then recall further that for those integers their highly-precise logarithms may be added to n to provide comparably highly-precise values at the endpoints of a region of integers $2^n \times I_a$ through $2^n \times I_{a+1}$. For example, table 36' of FIG. 3 illustrates highly precise base 2 logarithms for t=8 integers 8 through 15, while FIG. 6 illustrates that comparably highly-precise logarithms are known for $\log_2(160)$ and $\log_2(176)$ as those numbers represent $2^4 \times 10$ and $2^4 \times 11$. In other words, FIG. 6 demonstrates an example of the highly-precise logarithms at the endpoints of $2^n \times I_a=160$ through $2^n \times I_{a+1}=176$. Accordingly, the endpoints of $2^n \times I_a$ and $2^n \times I_{a+1}$ for such a region may be substituted into Equation 23 for its known endpoints a and b, thereby providing the following Equation 24 for sake of piecewise linearization between those known endpoints as follows:

$$\hat{\log}_2(x) = \qquad \text{Equation 24}$$

$$\frac{\log_2(2^n \times I_a) - \log_2(2^n \times I_{a+1})}{(2^n \times I_a) - [2^n \times (I_a + 1)]}(x - (2^n \times I_a)) + \log_2(2^n \times I_a)$$

Equation 24 also may be simplified as shown according to the following Equation 25:

$$\hat{\log}_2(x) = \frac{n + \log_2(I_a) - [n + \log_2(I_{a+1})]}{-2^n}(x - (2^n \times I_a)) + \qquad \text{Equation 25}$$

$$n + \log_2(I_a) =$$

-continued $$\frac{\log_2(I_{a+1}) - \log_2(I_a)}{2^n}(x - (2^n \times I_a)) + n + \log_2(I_a)$$

To further solve Equation 25, note that any given value of x in a region such as shown in FIG. 6 has been shown to be Δ apart from the lower endpoint, that is, such a value of x is equal to $(2^n \times I_a) + \Delta$. Thus, substituting the latter into Equation 25 for x yields the following Equation 26:

$$l\hat{o}g_2(x) = \frac{\log_2(I_{a+1}) - \log_2(I_a)}{2^n}[(2^n \times I_a) + \Delta) - (2^n \times I_a)] + \quad \text{Equation 26}$$

$$n + \log_2(I_a) = \frac{\log_2(I_{a+1}) - \log_2(I_a)}{2^n}\Delta + n + \log_2(I_a)$$

Given the preceding, Equation 26 provides an estimate of the base 2 logarithm of a value x located between two endpoints of a region bounded by $2^n$ times each of $I_a$ and $I_{a+1}$. Accordingly, Equation 26 provides the preferred embodiment methodology for providing a base 2 logarithm for the value of x stored in a storage element 32 of FIG. 2. At first glance, solving Equation 25 appears to require the calculation of three base 2 logarithms (two in the numerator, one in the overall sum) as well as a divide (due to the denominator). However, each logarithm value in Equation 25 has been shown above to be readily available from table 36, that is, table 36 already includes the base 2 logarithm of any integer in the power of 2 range of $I_1$ through $I_t^2$, and it is shown above that $I_a$ and $I_{a+1}$ are within this range of integers. Accordingly, under the preferred embodiments, combiner 38 solves Equation 26 using the inputs available to it. In other words, the three base 2 logarithms are readily available from table 36, and n and Δ are derived directly from storage element 32, provided the MSD has been detected. Lastly, the division by $2^n$ may be provided merely by shifting the result to the right n times. Accordingly, under the preferred embodiment, Equation 26 may be solved with two loads (for the values $\log_2(I_{a+1})$ and $\log_2(I_a)$), one subtraction, one n-bit shift, one multiply, and two adds.

Having demonstrated the ability of estimator 30 of FIG. 2 to perform base 2 logarithmic estimation using Equation 26, that operation now may be demonstrated with respect to the example of x=173 shown in that figure. Consider once more the example where t=3. Accordingly, table 36 is addressed with the value of 010, thereby outputting to combiner 38 the value of $\log_2(I_a)$ which in this example is $\log_2(10)$ and which, as shown in Table 4, earlier, is 3.321928. In addition, note that table 36 is also caused to output the $\log_2(I_{a+1})$ since that value is also needed by Equation 26; note that this aspect may be performed by separately addressing table 36 (e.g., a burst of addresses including the address of the t bits and that address incremented by one), or by implementing table 36 in a manner so that when it is addressed it outputs the addressed value as well as the value and then next higher address. Further, from the fact that MSD−t=n, in this example n=4 and Δ=1101 (i.e., decimal 13). Equation 26, when completed with these values, is as shown in the following Equation 27:

$$l\hat{o}g_2(173) = \frac{\log_2(11) - \log_2(10)}{2^4}13 + 4 + \log_2(10) = \quad \text{Equation 27}$$

-continued $$\frac{3.459432 - 3.321928}{16}13 + 4 + 3.321928 = 7.433650$$

Given the preceding, the overall operation of estimator 30 of FIG. 2 may be summarized as follows. Establish a value for t and prepare in table 36 a set of highly-precise base 2 logarithms for integers $I_t$ through $I_2^t$ equal to $2^t$ to $2^{t+1}-1$ (the base 2 logarithm of $2^{t+1}$ also will be needed, but it is equal to t+1 and therefore need not be tabled unless doing so simplifies the implementation). Locate the position of the MSD with MSD detector 34. Use the t bits following the MSD to address table 36. Define n=MSD−t and Δ to be the value of the bits, if any, in the lesser significant bit position(s) in storage element 32 following the t bits. Solve Equation 26, using the two loads, one subtraction, one n-bit shift, one multiply, and two adds described above.

Having now developed the preferred embodiments directed to approximating a logarithm, further within the inventive teachings is the inverse operation, that is, the inverse logarithm (or referred to herein as the antilog). By way of context, recall from the discussion of FIG. 1 that such an operation may arise where the amplitude of an input signal has been measured as a value of x, and a logarithm has been taken to establish $f(x)$. Next, to perform a gain adjustment, it is desirable to once again determine a value x, as it relates to processing of the input signal. Additionally in this context, note that some intermediate steps have occurred to the value of $f(x)$ before the antilog evaluation occurs, so the actual result of the antilog returns a value of x that differs from the original value of x as measured relative to the input signal. In any event, however, the antilog produces a value that in some manner relates to the input signal, and in the example of FIG. 1 is used with respect to the gain adjustment operation.

By way of further introduction to the antilog embodiments, note in view of the above that the following discussion now sets forth to provide an embodiment which presents x, given a binary representation of the base 2 logarithm of x (i.e., given the value of i+f from Equation 4). Since the current embodiment sets forth to perform an inverse of the earlier-described logarithm embodiments, it is also now noted that the preferred method of translating i+f back to the value of x also is achieved through separate analyses concerning the integer and decimal portions of i+f. Lastly, note that the following antilog embodiments preferably also pertain to base 2, but as discussed earlier with respect to logarithms, the following antilog teachings also may apply to other base systems such as base 10.

To better illustrate the antilog embodiment, two of the earlier Equations are now re-stated simply to have them readily accessible for view and discussion, and from which the antilog embodiment may be confirmed. Specifically, immediately below are set forth Equations 4 and 8, which were explored in detail in the previous discussions:

$$\log_2(x) = i+f \quad \text{Equation 4}$$

$$p = MSD = i \quad \text{Equation 8}$$

Equations 4 and 8 demonstrate a first portion of the inverse operation, namely, developing i directly from the value $\log_2(x)$. For instance, returning to the previous example of x=173, then the estimate of $\log_2(x)$ is 7.433650. Thus, consider the operation of the preferred embodiment antilog, the input is $\log_2(x) = 7.433650$, and the goal is to return a value of x=173. Equation 8 indicates that the MSD is the same as the integer portion (as shown in Equation 4) of the value for $\log_2(x)$. Accordingly, in the present example, that integer portion equals 7 and, hence, i=7 in this case. In other words, at this point it is known that x is as shown in the binary form shown in the following Table 7:

TABLE 7

| x | 1 | — | — | — | — | — | — | — |
|---|---|---|---|---|---|---|---|---|
| Bit position | 7 | 6 | 5 | 4 | 3 | 2 | 1 | 0 |

Next, therefore, the preferred embodiment for the antilog operation must determine the binary values for the remaining less significant bits in x, which in the present example correspond to bit positions 6 through 0.

Having provided logarithm estimator 30 in the form of FIG. 2 in inverse fashion, a first set of the bits in lesser significance and adjacent to the MSD are recoverable given that t was defined earlier with respect to such a group of bits, that is, recall that t is a predetermined number relative to table 36. For instance, recall further the example of x=173 and where t=3. In this case, for sake of the antilog an additional t (e.g., 3) bits following the MSD may be determined by access to the stored highly-precise logarithms in table 36. Specifically, recall also that earlier it is shown that n=MSD−t. At this point, since t is predetermined and the MSD has been identified by the integer i in the value of $\log_2(x)$ at issue, then n is also known. For instance, in the present example, n=MSD−t=7−3=4. Further, recall that x is located in a region bounded by endpoints $2^n \times I_a$ and $2^n \times I_{a+1}$ and the logarithms of those endpoints can be found by adding the integer n to the logarithm of $I_a$ stored in table 36. Therefore, toward finding the antilog of $\log_2(x)$ and, thus, in converse fashion, then $I_a$ can be detected by identifying the logarithm stored in table 36 that is closest to but below the provided value of $\log_2(x)$ minus n. Continuing then with the example of trying to identify x=173 from its $\log_2(173)$ =7.433650, first n is subtracted from that value as shown in the following Equation 28:

$$\log_2(x) - n = 7.433650 - 4 = 3.433650 \quad \text{Equation 28}$$

Next, table 36 can be accessed to determine the integer $I_a$ having a base 2 logarithm closest to but not greater than the result of 3.433650 from Equation 28. Note that table 36 may be accessed in various fashions to make this determination. For example, some type of converging addressing scheme may be implemented whereby table 36 is repeatedly addressed until its output converges on the value closest to but not greater than the result of Equation 28. As another example, table 36 may be implemented as a content addressable memory whereby the contents are input to the table to return the address of the location that has contents matching the input. In any event, for the present example and recalling that Table 4 and table 36' of FIG. 3 show the base 2 logarithm values for such an example, one skilled in the art will confirm that the address location that satisfies these criteria is binary 010, which corresponds to the base 2 logarithm of decimal 10, that is, $I_a$ equals decimal 10.

Having determined the address of $I_a$ equal to binary 010, that address forms the t bits that follow the MSD in Table 7. In other words, for the example of x=173 and $\log_2(x)$ =7.433650, at this point in the antilog determination it is known that x is as shown in the binary form shown in the following Table 8:

TABLE 8

| x | 1 | 0 | 1 | 0 | — | — | — | — |
|---|---|---|---|---|---|---|---|---|
| Bit position | 7 | 6 | 5 | 4 | 3 | 2 | 1 | 0 |

The preceding is further appreciated by observing that Table 8 at this point represents that the preferred embodiment, in effect, pre-pends a binary 1, which is the MSD, to the most significant bit of that address. Such an action thereby converts the address into a binary representation of the value of $I_a$. In the present example, therefore, pre-pending 1 to the most significant bit of the address of 010 creates 1010, which one skilled in the art will confirm equals decimal 10. Note further that this result occurs because the t bits are defined to follow the MSD which, by definition, equals a binary 1, and since table 36 stores $2^t$ integers starting at a value of $2^t$, then by pre-pending the MSD to the most significant bit of any of those addresses, the integer for which the corresponding base 2 logarithm is stored at the integer is thereby formed.

As an additional observation with respect to Table 8, note that the total value therein now lacks the final bits in x following the t bits. As defined earlier, therefore, these final bits are the value of Δ and, thus, the preferred embodiment for antilog estimation now endeavors to determine that value of Δ. In this regard, Equation 26 can be solved for Δ, as shown in the following Equation 29:

$$\Delta = \frac{(\log_2(x) - \log_2(I_a) - n)2^n}{\log_2(I_{a+1}) - \log_2(I_a)} \quad \text{Equation 29}$$

Equation 29 on its face indicates a divide operation due to the denominator; however, in some applications the complexity required of a divide is undesirable. Accordingly, under the preferred embodiment, it is noted that the factor provided by the denominator, $$\frac{1}{\log_2(I_{a+1}) - \log_2(I_a)},$$

is very nearly linear as a function of $I_a$. The reason for this is that the derivative of $\log_2(x)$ with respect to x is equal to 1/x. Also, $$\frac{1}{\log_2(I_{a+1}) - \log_2(I_a)}$$

is an approximation of the inverse of the derivative of $\log_2$, and is therefore very nearly equal to $\ln(2)(I_a+0.5)$, a linear function of $I_a$. The inaccuracy of this estimate arises from the fact that $$\frac{1}{\log_2(I_{a+1}) - \log_2(I_a)}$$

is not a perfect approximation of the inverse derivative. Accordingly, by substituting this linear function into Equation 29, an approximation for A can be provided as shown in Equation 30:

$$\Delta = (\log_2(x) - \log_2(I_a) - n) 2^n [\ln(2)(I_a + 0.5)] \quad \text{Equation 30}$$

Further, the fixed value of ln(2) can be tabled or otherwise stored, thereby reducing the implementation of Equation 30 to relatively non-complex operations.

Once $\Delta$ is found according to Equation 30, a number of its most significant bits are appended to the least significant bits of the value thus far created for the antilog which therefore includes the MSD bit followed by the t bits. Thus, the number of bits appended in this manner equals MSD−t, provided that results in a positive number (if negative, then $\Delta$ is not required and x already has been determined). By way of illustration and completing the example for x=173 and $\log_2(x)$=7.433650 as applied to Equation 30, it provides the result shown in the following Equation 31:

$$\Delta = (7.433650 - \log_2(10) - 4) 2^4 [\ln(2)(10 + 0.5)] \quad \text{Equation 30}$$

$$= (7.433650 - 3.321928 - 4) 2^4 [0.693147(10.5)] = 13.009 \quad \text{Equation 31}$$

Note the result of Equation 31 is not an exact integer, whereas it is known from earlier that for x=173 then $\Delta$=13. Thus, the additional decimal value of 0.009 is owing to the approximation provided above, namely, that the denominator of Equation 29 is not a perfect approximation. However, under the preferred embodiments, this slight deviation does not suffer any additional approximation error as compared to the preferred embodiment for estimating the logarithm because the inverse logarithm approach is able to identify the MSD and the t bits, thereby constraining the remaining necessary accuracy to the least significant bits, if any, following the MSD and t bits. In other words, due to this finite number of bits equal to MSD−t (if that result is a positive number), the estimation of $\Delta$ provided by Equation 30 can be truncated to accommodate only the remaining unknown bits in x (i.e., following the MSD and t bits), and any remaining portion will therefore not affect the overall accuracy. Indeed, empirical results have shown that the above approximation returns x exactly when the logarithm from which it is working was produced by the preferred embodiment estimator 30. Further, when the logarithm is fully precise, the antilogarithm estimator is still on par with the accuracy of estimator 30. Given the above and completing the example for x=173 then $\Delta$=13, then the final four bits following t in Table 8 can be completed to indicate the Equation 31 finding that then $\Delta$=13.009, by truncating that value to four bits thereby yielding a value of 1101 (i.e., decimal 13) and completing the value of x having started with the base 2 logarithm of x, as shown in the following Table 9:

TABLE 9

| x | 1 | 0 | 1 | 0 | 1 | 1 | 0 | 1 |
|---|---|---|---|---|---|---|---|---|
| Bit position | 7 | 6 | 5 | 4 | 3 | 2 | 1 | 0 |

From Table 9, therefore, the antilog of $\log_2(x)$=7.433650 has been found to be x=173.

By way of review and to further illustrate the preceding antilog aspects, FIG. 8 illustrates a block diagram of an antilog estimator 50. As detailed later, estimator 50 operates to receive a value of $\log_2(x)$ at its input $50_{in}$ and to produce an estimation of its base 2 inverse logarithm, x, at its output $50_{out}$. Thus, estimator 50 may be incorporated, by way of example, into gain circuit 20 in FIG. 1 to provide the antilog functionality of that circuit for reasons discussed earlier. Alternatively, the present inventive scope contemplates the inclusion of estimator 50 into other devices that require an estimation of an antilog. Further in this regard, estimator 50 is shown in block functional form and, thus, one skilled in the art may embody these blocks in separate or combined form based on various design considerations.

Turning then to antilog estimator 50, it includes a storage device 52 (e.g., register or memory space) for storing the binary representation of the $\log_2(x)$, where that representation includes both the integer and fraction (or decimal) portion discussed earlier in connection with Equation 4 as i+f. Storage device 52 outputs the value of i+f to a subtraction function 54. Additionally, storage device 52 outputs the integer portion, i; as shown above, the value of the integer i indicates the bit position of the MSD and, hence, the output of i causes the MSD to be written in a manner shown functionally as a switch 53 to the appropriate bit location in a result storage device 56 (e.g., register or memory space) that ultimately provides the estimated value of x. Returning to storage device 52, the integer, i, output is also connected to an n determination block 58, which as defined above determines the value of n having received the MSD and given the predetermined value of t. The n output of block 58 is provided to subtraction block 54, which in response subtracts n from i+f and provides the result, (i+f)−n, to the content input of table 36 (or a copy of that table or a suitable content addressable form of that table). The n output of block 58 is also provided to a $\Delta$ determination block 60. Table 36 (or its suitable substitute) outputs the address of the content provided to its input, or as stated above it provides the address of the value it stores that is closest to and less than the content provided to its input, and in either case the address is provided in a manner shown functionally as a switch 61 for writing the address as the t bits into result storage device 56, and table 36 also provides the address to an $I_a$ determination block 62. As stated above, the value of $I_a$ is a binary 1, indicating the MSD, pre-pended at the beginning of the address provided by table 36. The output, $I_a$, from block 62 is connected as an address to table 36, which in response provides the $\log_2(I_a)$ to $\Delta$ determination block 60. Additionally, the output, $I_a$, from block 62 is connected directly to $\Delta$ determination block 60. A determination block 60 provides the value of $\Delta$, in a manner shown functionally as a switch 63, to the least significant bits in result storage device 56.

The operation of antilog estimator 50 should be readily appreciated by one skilled in the art given the previous discussions and, thus, is only briefly reiterated here by way of summary. Once the $\log_2(x)$ is received in storage device 52, the integer immediately identifies the MSD location and thus the corresponding bit may be set by switch 53 in result storage device 56. Next, subtraction function 54 provides the result of (i+f)−n to locate the address of that content in table 36 (or the address of the content that is closest to, but less than, (i+f)−n)), and that address is also provided by switch 61 as the t bits following the MSD in result storage device 56. Finally, $\Delta$ is determined by block 60, and to the extent there are empty bits in result storage device 56 following the t bits, then $\Delta$ is truncated to the same number of those remaining bits and stored by switch 63 in result storage device 56. At this point, therefore, result storage device 56 stores the estimated value of x, that is, the antilog of $\log_2(x)$.

Having described preferred embodiments for estimating both a base 2 logarithm and a base 2 inverse logarithm, still another embodiment is contemplated within the present inventive teachings wherein the previous embodiments are combined to form a system for estimating a reciprocal. Such a system is now introduced with reference to the preceding teachings as well as certain additional observations. First, mathematically a reciprocal of a value x is as shown in the following Equation 32:

$$\frac{1}{x} = 2^{-log_2(x)}$$ Equation 32

Equation 32 thus demonstrates that having the ability the to take the base 2 logarithm of x and then applying the negative of that result as an exponent of 2 provides the reciprocal of x. The preceding embodiments, therefore, can be combined so as to achieve these operations, as is demonstrated below in connection with FIG. 9.

FIG. 9 illustrates a block diagram of a reciprocal estimator 70. As described later, reciprocal estimator 70 operates to receive a value of x at its input $70_{in}$ and to produce an estimation of its reciprocal, 1/x, at its output $70_{out}$. Input $70_{in}$ is connected to base two logarithm estimator 30 which, as detailed earlier, provides an estimate of the value $log_2(x)$ at its output $30_{out}$. The value of $log_2(x)$ from output $30_{out}$ is connected as a multiplicand input to a multiplier 72, which receives as a second multiplicand input the value of −1. Thus, multiplier 72 produces a product output equal to $-log_2(x)$, and this output is connected to input $50_{in}$ of antilog estimator 50. The output of antilog estimator 50 provides the output $70_{out}$ of reciprocal estimator which, as stated above, estimates the value for 1/x.

The operation of reciprocal estimator 70 in many respects should be readily ascertainable by one skilled in the art given the earlier discussion of base two logarithm estimator 30 of FIG. 2 and antilog estimator 50 of FIG. 8, where these two estimators are also implemented in reciprocal estimator 70 of FIG. 9. First, logarithm estimator 30 receives the input value x and, thus, outputs an estimate of $log_2(x)$. That value is then multiplied times −1, thereby providing a value of $-log_2(x)$ to antilog estimator 50. Second, however, note that the function of providing an antilog, as is achieved by antilog estimator 50, is the same as raising the value of 2 to the power provided as an input. In other words, if a value y is provided as an input to antilog estimator 50, then its output is $2^y$. Applying this observation to FIG. 9, therefore, by applying an input to antilog estimator 50 of $-log_2(x)$, then its output is $2^{log_2(x)}$. Lastly, from Equation 32, therefore, one skilled in the art will appreciate that given an input of x and a result of $2^{-log_2(x)}$, then the reciprocal 1/x has been formed. Of course, since estimators 30 and 50 provide estimations rather than extremely precise results, then the value of 1/x from reciprocal estimator 70 also will likewise include some level of error. However, because estimators 30 and 50 benefit from the use of highly-precise tabled values (in table 36), then this benefit is also realized by reciprocal estimator 70 in that its results may well provide better precision as opposed to other reciprocal estimation alternatives.

From the above, it may be appreciated that the above embodiments provide numerous advantages and alternatives to implement approximations for base 2 logarithms, base 2 antilogs, and reciprocals. However, while the present embodiments have been described in detail, one skilled in the art should appreciate that various substitutions, modifications or alterations could be made to the descriptions set forth above without departing from the inventive scope. For example, while FIG. 1 illustrates a dynamic range compressor, the present embodiments will apply to other circuits relating to audio signal processing. Indeed, it is further likely that the present embodiments are operable in connection with processing other signal types. As another example, while FIGS. 2, 8, and 9 illustrate specific hardware implementations of the various alternative methodologies provided, still other hardware or combined hardware and software implementations will be ascertainable by one skilled in the art. As yet another example, note that the embodiments above are primarily directed to base 2 determinations, as such arise often in the binary context and benefit in the present context from the ability to use the MSD for the reasons described earlier. Nevertheless, many of the present teachings may well apply directly to base 10 or other number based systems, or the results provided by a base 2 embodiment may be scaled according to Equation 2 to produce a result in an alternative numeric base. As still another example, while the highly-precise logarithms of table 36 preferably correspond to integers, they could alternatively corresponding to numbers including decimal portions. As a final example, while piecewise linearization is used to refine the logarithm from table 36, other estimation techniques as between the identified endpoints may be used. Thus, these examples as well as others as may be determined by one skilled in the art further illustrate the present inventive scope, as is defined by the following claims.

The invention claimed is:

1. A digital signal system for determining an approximate logarithm of a value of x having a base of b, comprising:
    circuitry for storing x as a digital representation;
    circuitry for identifying a most significant digit of the digital representation, wherein adjacent the most significant digit is located a set of bits in respective lesser significant bit locations;
    a table for storing a set of predetermined logarithms having the base of b, wherein each of the predetermined logarithms corresponds to a number in a set of numbers;
    circuitry for addressing the table in response to a first bit group of the set of bits in respective lesser significant bit locations, wherein in response the table is for outputting a one of the predetermined logarithms corresponding to a first number in the set of numbers; and
    circuitry for outputting the approximate logarithm of the value of x in response to the one of the predetermined logarithms and further in response to a function estimation between logarithms at a first and second endpoint, the first endpoint corresponding to the first number in the set of numbers times a power of b and the second endpoint corresponding to a second number in the set of numbers times the power of b, wherein the function estimation estimates a logarithm at a number located at distance from one of the first and second endpoints, wherein the distance is responsive to a second bit group of the set of bits.

2. The digital system of claim 1:
    wherein the most significant digit corresponds to a bit position number MSD;
    wherein the first bit group consists of a number t of bits; and
    wherein the power of b is equal to ($2^{(MSD-t)}$) two raised to a power equal to MSD-t.

3. The digital system of claim 2 wherein the second bit group consists of all lesser significant bits adjacent to the first bit group.

4. The digital system of claim 2 wherein the second bit group indicates the distance from one of the first and second endpoints.

5. The digital system of claim 4 wherein the circuitry for storing x comprises circuitry for storing x as a binary representation.

6. The digital system of claim 5 wherein the base b equals two.

7. The digital system of claim 5:
wherein the first endpoint consists of a value $l_a$;
wherein the second endpoint consists of a value $l_{a+1}$;
wherein the distance consists of a value $\Delta$;
wherein the power equal to MSD-t consists of a value n; and
wherein the circuitry for outputting the approximate logarithm of the value of x determines the approximate logarithm of x according to an equation equal to $$\frac{\log_2(l_{a+1}) - \log_2(l_a)}{2^n} \Delta + n + \log_2(l_a).$$

8. The digital system of claim 7 wherein the value $l_a$ consists of a number in the set of numbers having predetermined logarithms stored in the table.

9. The digital system of claim 1 wherein the function estimation comprises a piecewise linear estimation.

10. The digital system of claim 1 wherein each number in the set of numbers consists of an integer.

11. The digital system of claim 1:
wherein the most significant digit corresponds to a bit position number MSD;
wherein the first bit group consists of a number t of bits; and
wherein the set of numbers having predetermined logarithms stored in the table consists of $2^t$ integers.

12. The digital system of claim 11 wherein the integers consist of consecutive integers from $2^t$ to $2^{t+1}-1$.

13. The digital system of claim 1 and further comprising:
an input for receiving a signal; and
circuitry for measuring an attribute of the signal, wherein the attribute relates at least in part to the value of x.

14. The system of claim 13 wherein the signal is an audio signal.

15. The system of claim 13 wherein the attribute of the signal is a signal amplitude.

16. The system of claim 1 wherein the value of x consists of a value $x_1$, and further comprising circuitry for receiving a signal $f(x)$ corresponding to the approximate logarithm of the value of $x_1$ and for, in response, determining an approximate antilog $x_2$ from the value of $f(x)$, wherein $x_2$ has the base b, the system comprising:
circuitry for storing the value of $f(x)$ as a digital representation, wherein the value of $f(x)$ has an integer portion and a decimal portion;
circuitry for setting a most significant digit bit position MSD of the approximate antilog $x_2$ in response to the integer portion of $f(x)$, wherein adjacent the most significant digit bit position MSD is located an antilog set of bits in respective lesser significant bit locations; and
circuitry for determining a value for each bit in a first bit group of t bits in the antilog set of bits in respective lesser significant bit locations in response to locating a predetermined logarithm in the table having a value relating to the value $f(x)$ minus (MSD-t).

17. The system of claim 16 wherein the circuitry for determining determines the value for each bit in the first bit group of t bits as an address of the located predetermined logarithm in the table.

18. The system of claim 16 wherein the circuitry for determining determines the value for each bit in the first bit group of t bits in response to locating a predetermined logarithm in the table having a value closest to and less than $f(x)$ minus (MSD-t).

19. The digital system of claim 18 and further comprising circuitry for determining a value for each bit in a second bit group of the antilog set of bits in respective lesser significant bit locations, wherein the second bit group consists of all lesser significant bits adjacent to the first bit group of t bits.

20. The system of claim 16 wherein the signal $f(x)$ directly represents the approximate logarithm of the value of x.

21. The system of claim 16 and further comprising circuitry for translating the approximate logarithm of the value of x into the signal $f(x)$.

22. The system of claim 21 wherein the circuitry for translating comprises audio processing circuitry.

23. The system of claim 1 and further comprising:
circuitry for forming a negative value of the approximate logarithm of the value of x; and
antilog circuitry for forming an approximate reciprocal of the value of x in response to the negative value of the approximate logarithm of the value of x.

24. The system of claim 23 wherein the antilog circuitry comprises:
circuitry for storing the negative value of the approximate logarithm of the value of x as a digital representation, wherein the negative value of the approximate logarithm of the value of x has an integer portion and a decimal portion;
circuitry for setting a most significant digit bit position MSD of the approximate logarithm of the value of x in response to the integer portion of the negative value of the approximate logarithm of the value of x, wherein adjacent the most significant digit bit position MSD is located a set of bits in respective lesser significant bit locations;
a table for storing a set of predetermined logarithms having the base b, wherein each of the predetermined logarithms corresponds to a number in a set of numbers; and
circuitry for determining a value for each bit in a first bit group of t bits in the set of bits in respective lesser significant bit locations in response to locating a predetermined logarithm in the table having a value relating to the negative value of the approximate logarithm of the value of x minus (MSD-t).

25. A method of operating a digital signal system for determining an approximate logarithm of a value of x having a base of b, comprising the steps of:
storing x as a digital representation;
identifying a most significant digit of the digital representation, wherein adjacent the most significant digit is located a set of bits in respective lesser significant bit locations;
addressing a table that stores a set of predetermined logarithms having the base of b, wherein each of the predetermined logarithms corresponds to a number in a set of numbers, wherein the addressing step comprises addressing the table in response to a first bit group of the set of bits in respective lesser significant bit locations, wherein in response the table is for outputting a one of the predetermined logarithms corresponding to a first number in the set of numbers; and outputting the approximate logarithm of the value of x in response to the one of the predetermined logarithms and further in response to a function estimation between logarithms at a first and second endpoint, the first endpoint corresponding to the first number in the set of numbers times a power of b and the second endpoint corresponding to a second number in the set of numbers times the power of b, wherein the function estimation estimates a logarithm at a number located at distance from one of the first and second endpoints, wherein the distance is responsive to a second bit group of the set of bits.

26. The method of claim 25:

wherein the most significant digit corresponds to a bit position number MSD;

wherein the first bit group consists of a number t of bits; and wherein the power of b is equal to $(2^{(MSD-t)})$.

27. The method of claim 26 wherein the second bit group consists of all lesser significant bits adjacent to the first bit group.

28. The method of claim 26 wherein the second bit group indicates the distance from one of the first and second endpoints.

29. The method of claim 28 wherein the step of storing x comprises storing x as a binary representation.

30. The method of claim 29 wherein the base b equals two.

31. The method of claim 29:

wherein the first endpoint consists of a value $l_a$;

wherein the second endpoint consists of a value $l_{a+1}$;

wherein the distance consists of a value $\Delta$;

wherein the power equal to MSD-t consists of a value n; and wherein the step of outputting the approximate logarithm of the value of x determines the approximate logarithm of x according to an equation equal to $$\frac{\log_2(I_{a+1}) - \log_2(I_a)}{2^n}\Delta + n + \log_2(I_a).$$

32. The method of claim 31 wherein the value $l_a$ consists of a number in the set of numbers having predetermined logarithms stored in the table.

33. The method of claim 25 wherein the function estimation comprises a piecewise linear estimation.

34. The method of claim 25 wherein each number in the set of numbers consists of an integer.

35. The method of claim 25:

wherein the most significant digit corresponds to a bit position number MSD;

wherein the first bit group consists of a number t of bits; and wherein the set of numbers having predetermined logarithms stored in the table consists of $2^t$ integers.

36. The method of claim 35 wherein the integers consist of consecutive integers from $2^t$ to $2^{t+1}-1$.

37. The method of claim 25 and further comprising:

receiving a signal at an input; and measuring an attribute of the signal, wherein the attribute relates at least in part to the value of x.

38. The method of claim 25 wherein the value of x consists of a value $x_1$, and further comprising receiving a signal $f(x)$ corresponding to the approximate logarithm of the value of $x_1$ and for, in response, determining an approximate antilog $x_2$ from the value of $f(x)$, wherein $x_2$ has the base b.

39. The method of claim 38 wherein the step of determining an approximate antilog $x_2$ comprises:

storing the value of $f(x)$ as a digital representation, wherein the value of $f(x)$ has an integer portion and a decimal portion;

setting a most significant digit bit position MSD of the approximate antilog $x_2$ in response to the integer portion of $f(x)$, wherein adjacent the most significant digit bit position MSD is located an antilog set of bits in respective lesser significant bit locations; and determining a value for each bit in a first bit group of t bits in the antilog set of bits in respective lesser significant bit locations in response to locating a predetermined logarithm in the table having a value relating to the value $f(x)$ minus (MSD-t).

40. The method of claim 39 wherein the step of determining determines the value for each bit in the first bit group of t bits as an address of the located predetermined logarithm in the table.

41. The method of claim 39 wherein the step of determining determines the value for each bit in the first bit group of t bits in response to locating a predetermined logarithm in the table having a value closest to and less than $f(x)$ minus (MSD-t).

42. The method of claim 41 and further comprising determining a value for each bit in a second bit group of the antilog set of bits in respective lesser significant bit locations, wherein the second bit group consists of all lesser significant bits adjacent to the first bit group of t bits.

* * * * *